United States Patent [19]

Emerson et al.

[11] Patent Number: 5,538,711
[45] Date of Patent: Jul. 23, 1996

[54] FOAM REDUCTION DURING SYNTHESIS OF MCM-41

[75] Inventors: Sean C. Emerson, Voorhees; Donald J. Klocke, Somerdale, both of N.J.

[73] Assignee: Mobil Oil Corporation, Fairfax, Va.

[21] Appl. No.: 376,256

[22] Filed: Jan. 23, 1995

[51] Int. Cl.$^6$ ................................................ C01B 39/00
[52] U.S. Cl. ...................... 423/701; 423/702; 423/704; 423/705
[58] Field of Search .................. 423/701, 702, 423/703, 704, 705

[56] References Cited

U.S. PATENT DOCUMENTS

| | | | |
|---|---|---|---|
| 3,784,479 | 1/1974 | Keil . | |
| 3,785,935 | 1/1974 | Householder et al. . | |
| 4,582,815 | 4/1986 | Bowes | 502/64 |
| 5,057,296 | 10/1991 | Beck | 423/277 |
| 5,098,684 | 3/1992 | Kresge et al. | 423/718 |
| 5,102,643 | 4/1992 | Kresge et al. | 423/702 |
| 5,108,725 | 4/1992 | Beck et al. | 423/705 |
| 5,112,589 | 12/1992 | Johnson et al. | 423/705 |
| 5,250,282 | 10/1993 | Kresge et al. | 423/705 |
| 5,304,363 | 4/1994 | Beck et al. | 423/705 |
| 5,308,602 | 5/1994 | Calabro et al. | 423/705 |

FOREIGN PATENT DOCUMENTS 3008212   1/1988   Japan .

OTHER PUBLICATIONS

Payne "Organic Coating Technology; vol. I, Oils Resins, Varnishes & Polymers" 1954 pp. 583–584.

*Primary Examiner*—Mark L. Bell
*Assistant Examiner*—David Sample
*Attorney, Agent, or Firm*—Ronald A. Bleeker; Dennis P. Santini; Lori F. Cuomo

[57] ABSTRACT

A method for synthesizing an ultra-large pore crystalline material which can be used as a sorbent or catalyst component for the conversion of organic and inorganic compounds is improved through the addition of an antifoaming agent. The addition of antifoaming agents reduces foaming without interfering with material synthesis. Elimination of foam allows for easier charging of autoclaves and processing of synthesis mixtures.

8 Claims, No Drawings

1

FOAM REDUCTION DURING SYNTHESIS OF MCM-41

FIELD OF THE INVENTION

The process of the present invention relates to the synthesis of M41S materials using antifoaming agents.

BACKGROUND OF THE INVENTION

Porous inorganic solids have great utility as catalysts and separation media for industrial applications. Catalytic and sorptive activity are enhanced by the extensive surface area provided by a readily accessible microstructure characteristic of these solids.

The porous materials in use today can be sorted into three broad categories using the details of their microstructure as a basis for classification. These categories are 1) amorphous and paracrystalline supports, 2) crystalline molecular sieves and 3) modified layered materials.

Variations in the microstructures of these materials manifest themselves as important differences in the catalytic and sorptive behavior of the materials, as well as differences in various observable properties used to characterize them. For example, surface area, pore size and variability in pore sizes, the presence or absence of X-ray diffraction patterns, as well as the details in such patterns, and the appearance of the materials when their microstructure is studied by transmission electron microscopy and electron diffraction methods can be used to characterize porous inorganic solids.

Amorphous and paracrystalline materials represent an important class of porous inorganic solids which have been used for many years in industrial applications. Typical examples of these materials are the amorphous silicas commonly used in catalyst formulations and the paracrystalline transitional aluminas used as solid acid catalysts and petroleum reforming catalyst supports.

The amorphous materials are generally characterized as "amorphous" since they are substances having no long range order. Unfortunately, this can be somewhat misleading since almost all materials are ordered to some degree, at least on the local scale. An alternate term which has been used to describe these materials is "X-ray indifferent". The microstructure of the silicas consists of 100–250 Å particles of dense amorphous silica (*Kirk-Othmer Encyclopedia of Chemical Technology*, 3rd Edition, Vol. 20, John Wiley & Sons, New York, p. 766–781, 1982), with the porosity resulting from voids between the particles. Since there is no long range order in these materials, the pore sizes tend to be distributed over a rather large range. This lack of order also manifests itself in the X-ray diffraction pattern, which is usually featureless.

Paracrystalline materials such as the transitional aluminas also have a wide distribution of pore sizes, but exhibit better defined X-ray diffraction patterns usually consisting of a few broad peaks. The microstructure of these materials consists of tiny crystalline regions of condensed alumina phases and the porosity of the materials results from irregular voids between these regions (K. Wefers and Chanakya Misra, "Oxides and Hydroxides of Aluminum", Technical Paper No. 19 Revised, Alcoa Research Laboratories, p. 54–59, 1987).

Despite any differences arising between these paracrystalline or amorphous materials, neither substance has long range order controlling the sizes of pores in the material. Consequently, variability in pore size is typically quite high.

2

The sizes of pores in these materials fall into what is known in the art as the "mesoporous range", which, for the purposes of this Application, is from about 13 to 200 Å.

In sharp contrast to these structurally ill-defined solids are materials whose pore size distribution is narrow because it is controlled by the precisely repeating crystalline nature of the materials' microstructure. These materials are referred to as "molecular sieves", the most important examples of which are zeolites.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction. These crystalline structures contain a large number of small cavities which may be interconnected by a number of still smaller channels or pores. These cavities and pores are uniform in size within a specific zeolitic material. Since the dimensions of these pores provide access to molecules of certain dimensions while rejecting those of larger dimensions, these materials are known as "molecular sieves". These molecular sieves have been utilized in a variety of ways in order to take advantage of their properties.

Molecular sieves, both natural and synthetic, include a wide variety of positive ion-containing crystalline silicates. These silicates can be described as a rigid three-dimensional framework of $SiO_4$ and Group IIIB element oxides, e.g. $AlO_4$, in which the tetrahedra are cross-linked by the sharing of oxygen atoms. The ratio of the total Group IIIB element, e.g. aluminum, and Group IVB element, e.g. silicon, atoms to oxygen atoms is 1:2. The electrovalence of the tetrahedra containing the Group IIIB element, e.g. aluminum, is balanced by the inclusion of a cation in the crystal. Examples of such cations include alkali metal or alkaline earth metal cations. This can be expressed wherein the ratio of the Group IIIB element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449); zeolite ZSM-20 (U.S. Pat. No. 3,972,983); ZSM-35 (U.S. Pat. No. 4,016,245); and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, with ratios from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up, as measured within the limits of present analytical measurement techniques. U.S. Pat. No. 3,941,871 (U.S. Pat. No. Re. 29,948) discloses a porous crystalline silicate made from a reaction mixture containing no deliberately added aluminum in the recipe and exhibiting the X-ray diffraction pattern characteristic of ZSM-5. U.S. Pat. Nos. 4,061,724; 4,073,865 and 4,104,294 describe crystalline silicates of varying alumina and metal content.

Additionally, aluminum phosphates are taught in the U.S. Pat. Nos. 4,310,440 and 4,385,994, for example. These aluminum phosphate materials have essentially electroneutral lattices. U.S. Pat. No. 3,801,704 teaches an aluminum phosphate treated in a certain way to impart acidity.

An early reference to a hydrated aluminum phosphate which is crystalline until heated at about 110° C., at which point it becomes amorphous or transforms, is the "$H_1$" phase or hydrate of aluminum phosphate of F.d'Yvoire, *Memoir Presented to the Chemical Society*, No. 392, "Study of Aluminum Phosphate and Trivalent Iron", Jul. 6, 1961 (received), pp 1762–1776. This material, when crystalline, is identified by the JCPDS International Center for Diffraction Data card number 15–274. Once heated at about 110° C., however, the d'Yvoire material becomes amorphous or transforms to the aluminophosphate form of tridymite.

Compositions comprising crystals having a framework topology after heating at 110° C. or higher and exhibiting an X-ray diffraction pattern consistent with a material having pore windows formed by 18 tetrahedral members of about 12–13 Å in diameter are taught in U.S. Pat. No. 4,880,611.

A naturally occurring, highly hydrated basic ferric oxyphosphate mineral, cacoxenite, is reported by Moore and Shen, *Nature*, Vol. 306, No. 5941, pp. 356–358 (1983) to have a framework structure containing very large channels with a calculated free pore diameter of 14.2 Å. R. Szostak et al., *Zeolites: Facts, Figures, Future*, Elsevier Science Publishers B.V., 1989, present work showing cacoxenite as being very hydrophilic, i.e. adsorbing non-polar hydrocarbons, only with great difficulty. Their work also shows that thermal treatment of cacoxenite causes an overall decline in X-ray peak intensity.

Silicoaluminophosphates of various structures are taught in U.S. Pat. No. 4,440,871. Aluminosilicates containing phosphorus, i.e., silicoaluminophosphates of particular structures are taught in U.S. Pat. Nos. 3,355,246 (i.e. ZK-21) and 3,791,964 (i.e., ZK-22). Other teachings of silicoaluminophosphates and their synthesis include U.S. Pat. Nos. 4,673,559 (two-phase synthesis method); 4,623,527 (MCM-10); 4,639,358 (MCM-1); 4,647,442 (MCM-2); 4,664,897 (MCM-4); 4,638,357 (MCM-5); and 4,632,811 (MCM-3).

A method for synthesizing crystalline metalloaluminophosphates is shown in U.S. Pat. No. 4,713,227. An antimonophosphoaluminate and the method for its synthesis are taught in U.S. Pat. No. 4,619,818. U.S. Pat. No. 4,567,029 teaches metalloaluminophosphates, and titaniumaluminophosphate and the method for its synthesis are taught in U.S. Pat. No. 4,500,651.

The phosphorus-substituted zeolites of Canadian Patents 911,416; 911,417; and 911,418 are referred to as "aluminosilicophosphate" zeolites. Some of the phosphorus therein appears to be occluded, not structural.

U.S. Pat. No. 4,363,748 describes a combination of silica and aluminum-calcium-cerium phosphate as a low acid activity catalyst for oxidative dehydrogenation. Great Britain Patent 2,068,253 discloses a combination of silica and aluminum-calcium-tungsten phosphate as a low acid activity catalyst for oxidative dehydrogenation. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

Other patents teaching aluminum phosphates include U.S. Pat. Nos. 4,365,095; 4,361,705; 4,222,896; 4,210,560; 4,179,358; 4,158,621; 4,071,471; 4,014,945; 3,904,550; and 3,697,550.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Å, with the largest reported being about 12 Å.

Certain layered materials, which contain layers capable of being spaced apart with a swelling agent, may be pillared to provide materials having a large degree of porosity. Examples of such layered materials include clays. Such clays may be swollen with water, whereby the layers of the clay are spaced apart by water molecules. Other layered materials are not swellable with water, but may be swollen with certain organic swelling agents such as amines and quaternary ammonium compounds. Examples of such non-water swellable layered materials are described in U.S. Pat. No. 4,859,648 and include layered silicates, magadiite, kenyaite, trititanates and perovskites. Another example of a non-water swellable layered material, which can be swollen with certain organic swelling agents, is a vacancy-containing titanometallate material, as described in U.S. Pat. No. 4,831,006.

Once a layered material is swollen, the material may be pillared by interposing a thermally stable substance, such as silica, between the spaced apart layers. The aforementioned U.S. Pat. Nos. 4,831,006 and 4,859,648 describe methods for pillaring the non-water swellable layered materials described therein and are incorporated herein by reference for definition of pillaring and pillared materials.

Other patents teaching pillaring of layered materials and the pillared products include U.S. Pat. Nos. 4,216,188; 4,248,739; 4,176,090; and 4,367,163; and European Patent Application 205,711.

The X-ray diffraction patterns of pillared layered materials can vary considerably, depending on the degree that swelling and pillaring disrupt the otherwise usually well-ordered layered microstructure. The regularity of the microstructure in some pillared layered materials is so badly disrupted that only one peak in the low angle region on the X-ray diffraction pattern is observed, at a d-spacing corresponding to the interlayer repeat in the pillared material. Less disrupted materials may show several peaks in this region that are generally orders of this fundamental repeat. X-ray reflections from the crystalline structure of the layers are also sometimes observed. The pore size distribution in these pillared layered materials is narrower than those in amorphous and paracrystalline materials but broader than that in crystalline framework materials.

Indeed, X-ray diffraction patterns have come to play an important role in identification of various crystalline materials, especially pillared layered materials. Nevertheless, it is the physical properties of these materials which render them valuable assets to the scientific and industrial communities. These materials are not only valuable when employed in the petroleum industry, but they have also been found to exhibit properties useful for a variety of applications including such fields as nonlinear optics and the biological and chemical sciences.

The use of surfactants generates foam in the synthesis of crystalline materials. The presence of foam poses problems in the syntheses, inhibition of raw material conversion and difficulties in movement of the product slurry, purification and filtration, and in the commercial manufacture of the above materials. Therefore, it is an object of the present invention to provide an M41S synthesis method which reduces the problem of foaming.

SUMMARY OF THE INVENTION

The method of the present invention involves the use of an antifoaming agent to reduce the foam produced by surfactants in M41S synthesis. By eliminating the foam, the synthesis and processing of these materials is enhanced. Crystallizer charging is generally inhibited by the presence of foam created by the large amount of surfactants used. By removing the foam, charging and transporting of the synthesis mixture is simplified.

The invention therefore includes a method for synthesizing a composition of matter comprising an inorganic, porous, non-layered crystalline phase material exhibiting, after calcination, an X-ray diffraction pattern with at least one peak at a d-spacing greater than about 18 Angstrom Units with a relative intensity of 100 and a benzene adsorption capacity of greater than 15 grams benzene per 100 grams of said material at 50 torr and 25° C., said method comprising the steps of:

(a) preparing a mixture capable of forming said composition, said mixture comprising a source of silica, a source of alumina, an organic (R') agent and a solvent or solvent mixture, wherein R' comprises an ion of the formula $R_1R_2R_3R_4Q^+$, wherein Q is nitrogen or phosphorus and wherein at least one of $R_1$, $R_2$, $R_3$ and $R_4$ is aryl or alkyl of from 6 to about 36 carbon atoms or combinations thereof, the remainder of $R_1$, $R_2$, $R_3$ and $R_4$ being selected from the group consisting of hydrogen, alkyl of from 1 to 5 carbon atoms and combinations thereof;

(b) maintaining said mixture under sufficient conditions of pH, temperature and time for formation of said composition of matter; and (c) recovering said composition of matter, wherein said mixture of step (a) comprises antifoaming agent.

DETAILED DESCRIPTION OF THE INVENTION

The present invention is directed to a method for improving the synthesis of the crystalline material of the invention such that the tendency of the synthesis mixture to generate foam is reduced. Addition of antifoaming agent reduces foaming without interfering with material synthesis.

Antifoaming agents are substances that reduce the surface tension of a liquid, thus inhibiting the formation of bubbles in the liquid when it is agitated. Suitable antifoaming agents for use in the method of the present invention include organic phosphates, polyoxyalkylene polymers, silicone fluids, such as organosiloxane polymers and siloxane glycol copolymers, and mixtures thereof. Any material which lowers the surface tension in the reaction mixture may serve as an antifoaming agent in the method of the present invention.

Generally, the amount of antifoaming agent used in the synthesis mixture is at least about 50 ppm, based on organic directing agent, and preferably at least about 100 ppm, based on organic directing agent.

Generally the addition of antifoaming agents is at a temperature in the range of from about 25° C. to about 302° C. The order of addition of the antifoaming agent to the synthesis mixture is not critical.

The material of this invention may be characterized as a novel synthetic composition of matter comprising an ultralarge pore size crystalline phase. This material may be an inorganic, porous, non-layered, crystalline phase material which can be characterized (in its calcined form) by an X-ray diffraction pattern with at least one peak at a d-spacing greater than about 18 Angstrom with a relative intensity of 100 and a benzene sorption capacity of greater than 15 grams of benzene per 100 grams of the material at 50 torr and 25° C. This material and its preparation and properties are described in further detail in U.S. Pat. No. 5,102,643, incorporated herein by reference.

The preferred form of the crystalline material is an inorganic, porous material having a hexagonal arrangement of uniformly sized pores with a maximum perpendicular cross-section pore diameter of at least about 13 Å Units, and typically within the range of from about 13 Å Units to about 200 Å Units, identified as MCM-41. This material exhibits a hexagonal electron diffraction pattern that can be indexed with a $d_{100}$ value greater than about 18 Angstrom which corresponds to at least one peak in the X-ray diffraction pattern. This material and its preparation and properties are described in further detail in U.S. Pat. No. 5,098,684, incorporated herein by reference.

The inorganic mesoporous crystalline material of this invention may have the following composition:

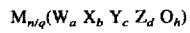

$$M_{n/q}(W_a\ X_b\ Y_c\ Z_d\ O_h)$$

wherein W is a divalent element, such as magnesium, and/or a divalent first row transition metal, e.g., manganese, cobalt and iron, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d)=1.

A preferred embodiment of the above crystalline material is when (a+b+c) is greater than d, and h=2. A further embodiment is when a and d=0, and h=2.

In the as-synthesized form, the material may have a composition, on an anhydrous basis, expressed empirically as follows:

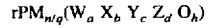

$$rPM_{n/q}(W_a\ X_b\ Y_c\ Z_d\ O_h)$$

where R is the total organic material not included in M as an ion, and r is the coefficient for R, i.e., the number of moles or mole fraction of R.

The M and R components are associated with the material as a result of their presence during crystallization, and are easily removed or, in the case of M, replaced by post-crystallization methods described below.

To the extent desired, the original M, e.g., sodium, ions of the as-synthesized support material can be replaced in accordance with conventional ion-exchange techniques. Preferred replacing ions include metal ions, hydrogen ions, hydrogen precursor, e.g., ammonium, ions and mixtures of these ions. Replacing ions include hydrogen, rare earth metals and metals of Groups VIIA (e.g., Mn), VIIIA (e.g., Ni),IB (e.g., Cu), IVB (e.g., Sn) of the Periodic Table of the Elements and mixtures of these ions.

The crystalline (i.e., having sufficient order to provide a diffraction pattern such as, for example, by X-ray, electron or neutron diffraction, following calcination, with at least one peak) mesoporous material may be characterized by its structure, which includes extremely large pore windows as well as by its high sorption capacity. The term "mesoporous" is used here to indicate crystals having uniform pores within the range of from about 13 Angstrom to about 200 Angstrom. The mesoporous materials have uniform pores within the range of from about 13 Angstrom to about 200 Angstrom, more usually from about 15 Angstrom to about 100 Angstrom. Since these pores are significantly larger than those of other crystalline materials, it is appropriate to refer to them as ultra-large pore size materials. For the purposes of this application, a working definition of "porous" is a material that adsorbs at least 1 gram of a small molecule, such as Ar, $N_2$, n-hexane or cyclohexane, per 100 grams of the solid, at appropriate temperature and atmospheric pressure.

The synthesis of the material is described in U.S. Pat. Nos. 5,108,725 and 5,057,296, incorporated herein by reference.

The material can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. The preferred MCM-41 materials have a hexagonal arrangement of large open channels that can be synthesized with open internal diameters from about 13 Angstrom to about 200 Angstrom. The term "hexagonal" is intended to encompass not only materials that exhibit mathematically perfect hexagonal symmetry within the limits of experimental measurement, but also those with significant observable deviations from that ideal state. A working definition as applied to the microstructure of MCM-41 would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the $d_{100}$ values from the electron diffraction patterns.

The size of the pores in the present mesoporous materials is large enough that the spatiospecific selectivity with respect to transition state species in reactions such as cracking is minimized (Chen et al., "Shape Selective Catalysis in Industrial Applications", *Chemical Industries*, 36, 41–61 (1989) to which reference is made for a discussion of the factors affecting shape selectivity). Diffusional limitations are also minimized as a result of the very large pores.

The most regular preparations of the present support material give an X-ray diffraction pattern with a few distinct maxima in the extreme low angle region. The positions of these peaks approximately fit the positions of the hkO reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of MCM-41 in them. Other techniques to illustrate the microstructure of this material are transmission electron microscopy and electron diffraction. Properly oriented specimens of the MCM-41 material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hkO projection of the hexagonal lattice and is related to the repeat distance $a_0$ between channels observed in the electron micrographs through the formula $d_{100}=a_0\sqrt{3}/2$. This $d_{100}$ spacing observed in the electron diffraction patterns corresponds to the d-spacing of a low angle peak in the X-ray diffraction pattern of the material. The most highly ordered preparations of the MCM-41 material obtained so far have 20–40 distinct spots observable in the electron diffraction patterns. These patterns can be indexed with the hexagonal hkO subset of unique reflections of 100, 110, 200, 210, etc., and their symmetry-related reflections.

In its calcined form, the crystalline material may be further characterized by an X-ray diffraction pattern with at least one peak at a position greater than about 18 Angstrom d-spacing (4.909° 2θ for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g., thermal treatment. Pore blocking inorganic amorphous materials, e.g., silica, and organics may be removed by contact with acid or base or other chemical agents such that the detrital material will be removed without detrimental effect on the crystal.

More particularly, the calcined crystalline material may be characterized by an X-ray diffraction pattern with at least two peaks at positions greater than about 10 Angstrom d-spacing (8.842°θ for Cu K-alpha radiation), at least one of which is at a position greater than about 18 Angstrom d-spacing, and no peaks at positions less than about 10 Angstrom d-spacing with relative intensity greater than about 20% of the strongest peak. Still more particularly, the X-ray diffraction pattern of the calcined support material will have no peaks at positions less than about 10 Angstrom d-spacing with relative intensity greater than about 10% of the strongest peak. In any event, at least one peak in the X-ray diffraction pattern will have a d-spacing that corresponds to the $d_{100}$ value of the electron diffraction pattern of the material.

The calcined inorganic crystalline material may also be characterized as having a pore size of about 13 Angstrom or greater as measured by physisorption measurements, described below. Pore size is defined by the maximum perpendicular pore diameter of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The support materials that have the largest pore sizes may require more highly collimated incident X-ray beams in order to resolve the low angle peak from the transmitted incident X-ray beam.

The diffraction data were recorded by step-scanning at 0.04 degrees of $2\theta$, where $\theta$ is the Bragg angle, and a counting time of 10 seconds for each step. The interplanar spacings, d's, were calculated in Angstrom, and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). The diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the support material, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as described below.

The above crystalline material, especially in its metal, hydrogen and ammonium forms, may be readily converted to another form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

MCM-41 can be prepared by one of several methods, each with particular limitations.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, described below. This first method comprises preparing a reaction mixture containing sources of, for example, alkali or alkaline earth metal (M), e.g., sodium or potassium, cation if desired, one or a combination of oxides selected from the group consisting of divalent element W, e.g., cobalt, trivalent element X, e.g., aluminum, tetravalent element Y, e.g., silicon, and pentavalent element Z, e.g., phosphorus, an organic (R) directing agent, described below, and a solvent or solvent mixture, such as, for example, $C_1$–$C_6$ alcohols, $C_1$–$C_6$ diols and/or water, especially water. The reaction mixture has a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3 + O_3/(YO2 + WO + Z2O5)$ | 0.1 to 100 | 0.1 to 20 |
| Solvent/ $(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/ (YO_2 + WO + Z_2O_5 + X_2O_3)$ | 0.01 to 20 | 0.05 to 5 |
| $M_{2/e}O/ YO_2 + WO + Z_2O_5 + X_2O_3)$ | 0 to 10 | 0 to 5 |
| $R_{2/f}O/ (YO_2 + WO + Z_2O_5 + X_2O_3)$ | 0.01 to 2.0 | 0.03 to 1.0 | where e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of MCM-41. In this, as well as the following methods for synthesis of MCM-41, the $R_{2/f}O/(YO_2+WO+Z_2O_5+X_2O_3)$ ratio is important. When this ratio is less than 0.01 or greater than 2.0, impurity products tend to be synthesized at the expense of the desired crystalline material.

A second method for synthesis of MCM-41 involves a reaction mixture having an $X_2O_3/YO_2$ mole ratio of from about 0 to about 0.5, a crystallization temperature of from about 25° C. to about 250° C., preferably from about 50° C. to about 175° C., and two separate organic directing agents, i.e., the organic and additional organic directing agents, described below. This second method comprises preparing a reaction mixture containing sources of, for example, alkali or alkaline earth metal (M), e.g., sodium or potassium, cation if desired, one or a combination of oxides selected from the group consisting of divalent element W, e.g., cobalt, trivalent element X, e.g., aluminum, tetravalent element Y, e.g., silicon, and pentavalent element Z, e.g., phosphorus, a combination of organic directing agent and additional organic directing agent (R), each described below, and a solvent or solvent mixture, such as, for example, $C_1$–$C_6$ alcohols, $C_1$–$C_6$ diols and/or water, especially water. The reaction mixture has a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/ $(YO_2 + WO + Z_2O_5 + X_2O_3$ | 1 to 1500 | 5 to 1000 |
| $OH^-/YO_2$ | 0 to 10 | 0 to 5 |
| $(M_{2/e}O + R_{2/f}O)/$ | | |

| Reactants | Useful | Preferred |
|---|---|---|
| $(YO_2 + WO + Z_2O_5 + X_2O_3)$ $M_{2/e}O/$ | 0.01 to 20 | 0.05 to 5 |
| $(YO_2 + WO + Z_2O_5 + X_2O_3)$ $R_{2/f}O/$ | 0 to 10 | 0 to 5 |
| $(YO_2 + WO + Z_2O_5 + X_2O_3)$ | 0.1 to 2.0 | 0.12 to 1.0 | where e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the precise value of the pH is not important for crystallization.

A third method for synthesis of MCM-41 is where X comprises aluminum and Y comprises silicon, the crystallization temperature must be from about 25° C. to about 175° C., preferably from about 50° C. to about 150° C., and an organic directing agent, described below, or, preferably a combination of that organic directing agent plus an additional organic agent, described below, is used. This third method comprises preparing a reaction mixture containing sources of, for example, alkali or alkaline earth metal (M), e.g., sodium or potassium, cation if desired, one or more sources of aluminum and/or silicon, an organic (R) directing agent, hereinafter more particularly described, and a solvent or solvent mixture, such as, for example $C_1$–$C_6$ alcohols, $C_1$–$C_6$ diols and/or water, especially water. The reaction mixture has a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| Solvent/$SiO_2$ | 1 to 1500 | 5 to 1000 |
| $OH^-/SiO_2$ | 0 to 10 | 0 to 5 |
| $(M_{2/e}O + R_{2/f}O)/$ $(SiO_2 + Al_2O_3)$ | 0.01 to 20 | 0.05 to 5 |
| $M_{2/e}O/$ $(SiO_2 + Al_2O_3)$ | 0 to 5 | 0 to 3 |
| $R_{2/f}O/$ $(SiO_2 + Al_2O_3)$ | 0.01 to 2 | 0.03 to 1 | where e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g., silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the synthesis of MCM-41 involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the $R_{2/f}O/SiO_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

In each of the above methods, batch crystallization of the crystalline material can be carried out under either static or agitated, e.g., stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g., from about 5 minutes to about 14 days. The crystals are then separated from the liquid and recovered. Following the synthesis, the crystalline material should be subjected to treatment to remove part or all of any organic constituent.

By adjusting conditions of the synthesis reaction for each method, like temperature, pH and time of reaction, etc., within the above limits, various embodiments of the MCM-41 crystalline material with a desired average pore size may be prepared. In particular, changing the pH, the temperature or the reaction time may promote formation of product crystals with different average pore size.

Non-limiting examples of various combinations of W, X, Y and Z contemplated for the first and second synthesis methods include:

| W | X | Y | Z |
|---|---|---|---|
| — | Al | Si | — |
| — | Al | — | P |
| — | Al | Si | P |
| Co | Al | — | P |
| Co | Al | Si | P |
| — | — | Si | — | including the combinations of W being Mg, or an element selected from the divalent first row transition metals, e.g., Mn, Co and Fe; X being B, Ga or Fe; and Y being Ge.

An organic directing agent for use in each of the above methods for synthesizing MCM-41 from the respective reaction mixtures is an ammonium or phosphonium ion of the formula $R_1R_2R_3R_4Q^+$, i.e.,

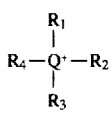

where Q is nitrogen or phosphorus and wherein at least one of $R_1$, $R_2$, $R_3$ and $R_4$ is aryl or alkyl of from 6 to about 36 carbon atoms, e.g., $-C_6H_{13}$, $-C_{10}H_{21}$, $-C_{16}H_{33}$ and $-C_{18}H_{37}$, or combinations thereof, the remainder of $R_1$, $R_2$, $R_3$ and $R_4$ being selected from hydrogen, alkyl of from 1 to 5 carbon atoms and combinations of these. The compound from which the above ammonium or phosphonium ion is derived may be, for example, the hydroxide, halide, silicate, or mixtures of these.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the required directing agent, when compared with other such agents known to direct synthesis of one or more other crystal structures, is believed due to its ability to form micelles which function as a template in the above reaction mixture in the nucleation and growth of the desired ultra-large pore crystals with the limitations discussed above. Non-limiting examples of these directing agents include cetyltrimethylammonium, cetyltrimethylphosphonium, cetylpyridinium, myristyltrimethylammonium, decyltrimethylammonium, dodecyltrimethylammonium and dimethyldidodecylammonium. Cetyltrimethylammonium chloride is particularly useful.

The reaction mixture components can be supplied by more than one source. The reaction mixture can be prepared either batchwise or continuously. Crystal size and crystallization time of M41S will vary with the nature of the reaction mixture employed and the crystallization conditions.

The crystals prepared by the synthesis procedure can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the sorbent is molded, such as by extrusion, the crystals can be extruded before drying or partially dried and then extruded. The crystals of the mesoporous material may be composited with a matrix material to form the finished sorbent and for this purpose conventional matrix materials such as alumina, silica-alumina and silica are suitable with preference given to silica as a non-acidic binder. Other binder materials may be used, for example, titania, zirconia and other metal oxides or clays. The mesoporous material is usually composited with the matrix in amounts from 80:20 to 20:80 by weight, typically from 80:20 to 50:50 mesoporous material:matrix. Compositing may be done by conventional means including mulling the materials together followed by extrusion of pelletizing into the desired finished catalyst particles. A preferred method for extrusion with silica as a binder is disclosed in U.S. Pat. No. 4,582,815.

The following examples illustrate the process of the present invention.

A series of tests are conducted using a 29 wt. % solution of cetyltrimethylammonium chloride (CTMA-Cl), a main surfactant in many M41S synthesis methods, with three antifoaming agents, Antifoaming Agent A, Antifoaming Agent B and Antifoaming Agent C, manufactured by Ultra Additives, Inc. The properties of Antifoaming Agents A, B, and C are set forth in Tables 1, 2 and 3, respectively. After conducting the tests, autoclave synthesis is performed using Antifoaming Agent A to demonstrate that the antifoaming agent would reduce foaming and not interfere in the formation of M41S.

TABLE 1

ANTIFOAMING AGENT A
FOAM BAM MS-455 (manufactured by Ultra Additives, Inc.)

| Specifications and Properties: | |
|---|---|
| Appearance | Translucent, off-white liquid |
| Viscosity (Brookfield RVF, Spindle #3, 20 RPM, 25° C.) cps | 2000 to 4000 |
| Weight per Gallon, pounds | 8.55 to 8.95 |
| pH (50% solution) | 7.0 TO 8.5 |
| % Non-volatile by Weight | 52 to 56 |
| Specific Gravity @ 25° C. (Theoretical) | 1.026 to 1.074 |
| Flash Point, PMCC/°C. | 204 |

TABLE 2

ANTIFOAMING AGENT B
FOAM BAN MS-525 (manufactured by Ultra Additives, Inc.)

| Specifications and Properties: | |
|---|---|
| Appearance | Translucent, off-white liquid |
| Viscosity (Brookfield RVF, Spindle #3, 20 RPM, 25° C.) cps | 2500 to 5500 |
| Weight per Gallon, pounds | 8.40 to 8.80 |
| pH (50% solution) | 7.0 to 8.5 |
| % Non-volatile by Weight | 56 to 60 |
| Specific Gravity @ 25° C. (Theoretical) | 1.008 to 1.056 |
| Flash Point, PMCC/°C. | 204 |

TABLE 3

ANTIFOAMING AGENT C
FOAM BAN MS-575 (manufactured by Ultra Additives, Inc.)

| Specifications and Properties: | |
|---|---|
| Appearance | Opaque, off-white liquid |
| Viscosity (Brookfield RVF, Spindle #3, 20 RPM, 25° C.) cps | 2000 to 4000 |
| Weight per Gallon, pounds | 8.55 to 8.95 |
| pH (50% solution) | 7.0 to 8.5 |
| % Non-volatile by Weight | 71 to 75 |
| Specific Gravity @ 25° C. (Theoretical) | 1.026 to 1.074 |
| Flash Point, PMCC/°C. | 204 |

EXAMPLE 1

An amount of 145.4 grams of 29 wt. % CTMA-Cl (150 ml.) is placed in a 600 ml. beaker. The contents are then agitated at 158 rpm with a stirrer for 30 seconds. After agitation, the total volume increased to 350 ml., with the liquid volume being 90 ml. Thus, 260 ml. of foam is generated without the presence of an anti-foam agent. The foam does not dissipate after 7 minutes.

EXAMPLE 2

An amount of 0.48 grams of a 5 wt. % solution of Antifoaming Agent A (570 ppm based on CTMA-Cl), as described in Table 1, is added to 145.4 grams of 29 wt. % CTMA-Cl (150 ml.) and is placed in a 600 ml. beaker. The contents are than agitated at 158 rpm with a stirrer for 30 seconds. After agitation, the total volume increased to 200 ml., with the liquid volume being approximately 125 ml. Thus, 75 ml. of foam is generated. After 30 seconds at rest, all foam is eliminated.

EXAMPLE 3

An amount of 0.084 grams of a 5 wt. % solution of Anitifoaming Agent A (100 ppm based on CTMA-Cl), as described in Table 1, is added to 145.4 grams of 29 wt. % CTMA-Cl (150 ml.) and is placed in a 600 ml. beaker. The contents are then agitated at 158 rpm with a STIRRER for 30 seconds. After agitation, the total volume increased to 225 ml., with the liquid volume being approximately 110 ml. Thus, 115. ml of foam is generated. After 2 minutes at rest, all foam is eliminated.

EXAMPLE 4

An amount of 0.48 grams of a 5 wt. % solution of Antifoaming Agent B (570 ppm based on CTMA-Cl), as described in Table 2, is added to 145.4 grams of 29 wt. % CTMA-Cl (150 ml.) and is placed in a 600 ml. beaker. The contents are then agitated at 158 rpm with a stirrer for 30 seconds. After agitation, the total volume increased to 225 ml., with the liquid volume being approximately 125 ml. Thus, 100 ml. of foam is generated. After 2 minutes at rest, all foam is eliminated.

EXAMPLE 5

An amount of 0.15 grams of a 5 wt. % solution of Antifoaming Agent B (180 ppm based on CTMA-Cl), as described in Table 2, is added to 145.4 grams of 29 wt. % CTMA-Cl (150 ml.) and is placed in a 600 ml. beaker. The contents are then agitated at 158 rpm with a stirrer for 30 seconds. After agitation, the total volume increased to 225 ml., with the liquid volume being approximately 125 ml. Thus, 100 ml. of foam is generated. After 7 minutes at rest, all foam is eliminated.

EXAMPLE 6

An amount of 0.043 grams of a 5 wt. % solution of Antifoaming Agent C (51 ppm based on CTMA-Cl), as described in Table 3, is added to 145.4 grams of 29 wt. % CTMA-Cl (150 ml.) and is placed in a 600 ml. beaker. The contents are then agitated at 158 rpm with a stirrer for 30 seconds. After agitation, the total volume increased to 210 ml., with the liquid volume being approximately 125 ml. Thus, 85 ml. of foam is generated. After 5 minutes at rest, all foam is eliminated.

EXAMPLE 7

An amount of 0.48 grams of a 5 wt. % solution of Antifoaming Agent C (570 ppm based on CTMA-Cl), as described in Table 3, is added to 145.4 grams of 29 wt. % CTMA-Cl (150 ml.) and is placed in a 600 ml. beaker. The contents are then agitated at 158 rpm with a stirrer for 30 seconds. After agitation, the total volume increased to 175 ml., with the liquid volume being approximately 140 ml. Thus, 35 ml. of foam is generated. After 30 seconds at rest, all foam is eliminated.

Example 1 shows a large amount of foam produced in the absence of antifoaming agent. In comparison, the use of antifoaming agent in Examples 2 to 7 results in a reduction in the amount of foam produced.

EXAMPLE 8

A 0.87 gram amount of a 5 wt. % solution of Antifoaming Agent A (100 ppm) is added to 1500 grams of 29 wt. % CTMA-Cl. Upon the addition of Antifoaming Agent A, all foam from the CTMA-Cl is eliminated. The resulting solution is charged to an autoclave and heated with 250 rpm agitation to 302° F. The mixture is held at 302° F. for 24 hours and then cooled to room temperature. Agitation of the final solution induced foam formation, but the foam disappeared over several hours showing that the antifoamant functioned after exposure to M41S synthesis conditions.

EXAMPLE 9

One part of a 45 wt. % sodium aluminate solution is added to 10.9 parts of a 25 wt. % tetramethylammonium hydroxide (TMA-OH) solution. 0.02 parts of a 5 wt. % solution of Antifoaming Agent A (100 ppm based on CTMA-Cl), as described in Table 1, is added to 31.9 parts of 29 wt. % CTMA-Cl, completely eliminating foam from the surfactant and the resulting CTMA-Cl solution is charged to an autoclave. The sodium aluminate/TMA-OH mixture is then added to the autoclave and mixed for 15 minutes at 60 rpm. No foam is observed inside the autoclave. 7.3 parts of precipitated silica (HiSil) is added to the autoclave and after mixing for 15 minutes, the synthesis mixture is heated to 257° F. at 90 rpm. The mixture is held at this temperature for 48 hours and then cooled to room temperature. The product drycake from the synthesis is identified as MCM-41 by x-ray diffraction.

EXAMPLE 10

0.003 parts of a 5 wt. % solution of Antifoaming Agent A (100 ppm based on CTMA-Cl), as described in Table 1, is added to 5.4 parts of 29 wt. % CTMA-Cl, completely eliminating foam from the surfactant and the resulting CTMA-Cl solution is charged to an autoclave. 1.0 part of a 25 wt. % TMA-OH solution is then added to the autoclave and mixed for 15 minutes at 60 rpm. No foam is observed inside the autoclave. 1.0 part of precipitated silica (HiSil) is added to the autoclave and after mixing for 15 minutes, the synthesis mixture is heated to 212° F. at 90 rpm. The mixture is held at this temperature for 28 hours. The temperature is then raised to 302° F. for an additional 27.5 hours and cooled to room temperature. The product drycake from the synthesis is identified as MCM-41 by x-ray diffraction.

Examples 9 and 10 show that the use of antifoaming agent has no effect on the M41S product.

Changes and modifications in the specifically described embodiments can be carried out without departing from the scope of the invention which is intended to be limited only by the scope of the appended claims.

We claim:

1. A method for synthesizing a composition of matter comprising an inorganic, porous, non-layered crystalline phase material exhibiting, after calcination, an X-ray diffraction pattern with at least one peak at a d-spacing greater than about 18 Angstrom Units with a relative intensity of 100 and a benzene adsorption capacity of greater than 15 grams benzene per 100 grams of said material at 50 torr and 25° C., said method comprising the steps of:

(a) preparing a mixture capable of forming said composition, said mixture comprising a source of silica, a source of alumina, an organic (R') agent and a solvent or solvent mixture, wherein R' comprises an ion of the formula $R_1R_2R_3R_4Q^+$, wherein Q is nitrogen or phosphorus and wherein at least one of $R_1$, $R_2$, $R_3$ and $R_4$ is aryl or alkyl of from 6 to about 36 carbon atoms or combinations thereof, the remainder of $R_1$, $R_2$, $R_3$ and $R_4$ being selected from the group consisting of hydrogen, alkyl of from 1 to 5 carbon atoms and combinations thereof;

(b) maintaining said mixture under sufficient conditions of pH, temperature and time for formation of said composition of matter; and (c) recovering said composition of matter, wherein said mixture of step (a) further comprises antifoaming agent.

2. The method of claim 1, wherein the organic (R') agent is supplied to the reaction mixture in the form of a halide salt.

3. The method of claim 2, wherein the halide salt comprises tetraalkylammonium chloride.

4. The method of claim 2, wherein the halide salt comprises cetyltrimethylammonium chloride.

5. The method of claim 1, wherein said crystalline phase material is MCM-41.

6. The method of claim 1, wherein said antifoaming agent is in an amount of at least 50 ppm, based on said organic (R') agent.

7. The method of claim 1, wherein said antifoaming agent is in an amount of at least 100 ppm, based on said organic (R') agent.

8. The method of claim 1, wherein said antifoaming agent is selected from the group consisting of polyoxyalkylene polymers, organosiloxane polymers, siloxane glycol copolymers and mixtures thereof.

* * * * *